US008380563B2

(12) United States Patent
Datar et al.

(10) Patent No.: US 8,380,563 B2
(45) Date of Patent: Feb. 19, 2013

(54) USING PREVIOUS USER SEARCH QUERY TO TARGET ADVERTISEMENTS

(75) Inventors: Mayur Datar, Santa Clara, CA (US); Roberto J. Bayardo, Morgan Hill, CA (US)

(73) Assignee: Google Inc., Mountain View, CA (US)

( * ) Notice: Subject to any disclaimer, the term of this patent is extended or adjusted under 35 U.S.C. 154(b) by 560 days.

(21) Appl. No.: 12/145,977

(22) Filed: Jun. 25, 2008

(65) Prior Publication Data

US 2009/0006207 A1   Jan. 1, 2009

Related U.S. Application Data

(60) Provisional application No. 60/946,981, filed on Jun. 28, 2007.

(51) Int. Cl.
*G06Q 40/00* (2012.01)
(52) U.S. Cl. .............. 705/14; 705/39; 705/40; 705/41
(58) Field of Classification Search .............. 705/14, 705/15–45; 707/1–4, 10, 100, 102, 104
See application file for complete search history.

(56) References Cited

U.S. PATENT DOCUMENTS

| 6,385,592 | B1 | 5/2002 | Angles et al. | |
| 7,587,385 | B2 * | 9/2009 | Vayssiere ........................ | 1/1 |
| 2004/0059708 | A1 * | 3/2004 | Dean et al. ........................ | 707/1 |
| 2005/0094266 | A1 | 5/2005 | Liu et al. | |
| 2005/0222989 | A1 | 10/2005 | Haveliwala et al. | |
| 2006/0082873 | A1 | 4/2006 | Allen et al. | |
| 2006/0221021 | A1 | 10/2006 | Hajjar et al. | |
| 2006/0221022 | A1 | 10/2006 | Hajjar et al. | |
| 2007/0014318 | A1 | 1/2007 | Hajjar et al. | |

FOREIGN PATENT DOCUMENTS

| KR | 10-2001-0091801 | 10/2001 |
| WO | 2004/111771 | 5/2005 |

OTHER PUBLICATIONS

"A Consumption Model for Targeted Electronic Advertising", Intel Architecture Labs, Rick Dedrick, IEEE Multimedia, Summer 1995.*
International Preliminary Report on Patentability, PCT/US2008/068151, mailed Jan. 14, 2010, 7 pages.

* cited by examiner

*Primary Examiner* — Hai Tran
(74) *Attorney, Agent, or Firm* — Fish & Richardson P.C.

(57) ABSTRACT

A system and method to target advertisements to a user search query using a previously entered user search query as well as the current search query. The previously entered search query can accompanying the current search query in a query referrer, or can be determined separately from the current search query. The relevance of the previous search query is determined with respect to the current search query, and if found relevant a combination of the two query terms is used to find a set of advertising keywords from which candidate advertisements to be targeted and served to the user with search results are found. The process can be extended to additional search queries.

12 Claims, 2 Drawing Sheets

USING PREVIOUS USER SEARCH QUERY TO TARGET ADVERTISEMENTS

RELATED APPLICATIONS

This application claims priority to U.S. Provisional Application No. 60/946,981 filed on Jun. 28, 2007, entitled "Using Previous User Search Query to Target Advertisements", the entire contents of which are incorporated herein by reference.

TECHNICAL FIELD

The subject matter of this patent application is generally related to advertising, and more specifically relates to advertising in an online medium.

BACKGROUND

Interactive advertising on the Internet relies upon providing relevant messages to users. In advertising systems that provide relevant sponsored messages accompanying search results, such as Google AdWords, a user search query seeking search results can also be used to target advertisements to accompany those search results. Such a system is described, for example, in U.S. Pat. No. 6,816,857, entitled "Meaning-Based Advertising and Document Relevance Determination," issued Nov. 9, 2004, and incorporated by reference in its entirety herein.

SUMMARY

In order to better target advertisements that are relevant to the meaning of a search query, it is proposed to use the previous query, in addition to the current query, to target ads, as many search queries are preceded by other queries that may be relevant to the purpose of the current query. This may help in providing and displaying more relevant ads to the user and/or could help in increasing the number of relevant ads being shown. This can increase user response to advertisements, providing the search engine end user with an improved experience, and providing advertisers with increased advertising opportunities. This method can be used to leverage a preceding search query, or multiple previous several queries in a user's session. Advantageously, when a search request is received by a search service from a standard web browser using a standard communication protocol such as hypertext transfer protocol (HTTP), the request includes a referrer header that contains the URL from which a user landed on the present page. When the previous page was a search results page, and the user enters a new search query, then the referrer contains information representing the preceding query entered by the user. Other methods can be used for communicating the previous search query, including cookies, DOM objects, IP address tracking, plug-ins, and persistent user login sessions can be used.

Advertising targeting refinement can permit better accuracy in advertisements while providing embodiments which maintain user privacy. Targeting information about advertisements relevant to the search query can be refined based on knowledge of the previous search query found in the referrer header, although one can also use cookies, personalization objects, user login sessions, browser plug-ins or DOM objects, user-end advertising software, or other tracking infrastructure.

In one embodiment, a method for serving targeted ads using a current search query and a referrer including a previous search query is provided, comprising: receiving at a search server current search query from a user; receiving a referrer associated with the received current search query, the referrer including information identifying a previous search query from the user; determining the relevance of the previous search query to the current search query; mapping the current search query to at least one advertising keyword based on at least the current search query and the relevance of the previous search query to the current search query; selecting at least one advertisement using the advertising keyword; and, delivering the at least one advertisement to the user with the results of the current search query.

In one embodiment, the determining step further comprises disambiguating advertising keywords associated with the current search query based on advertising keywords relevant to the current search query that are associated with the previous search query.

In one embodiment, the method further comprises: retaining the results of the mapping step between the current search query and the previous search query; receiving a next search query from the user, receiving a referrer associated with the next search query, the referrer including information identifying the current search query; determining the relevance of the current search query to the next search query; determining the relevance of the previous search query to the next search query using the results of the retaining step; mapping the next search query to at least one advertising keyword based on at least the next search query, the relevance of the current search query to the next search query, and the relevance of the previous search query to the next search query; selecting at least one advertisement using the advertising keyword; and, delivering the at least one advertisement to the user with the results of the next search query.

In another embodiment, a system for providing targeted advertisements to a user is provided, comprising: a search server on a network for receiving a search query via a standard communications protocol and serving search query results in response to the search queries, the search query results associated with at least one advertisement; a first search query associated with a user transmitted in the standard communications protocol to the search server; a second search query associated with the user transmitted to the search server in the standard communications protocol, including information identifying the first search query; and, an advertising server including: a keyword engine for determining potential advertising keywords associated with the second search query received from the search server, a disambiguation engine for refining the potential advertising keywords associated with the second search query by determining potential advertising keywords associated with the first search query that are relevant to the second search query to find a set of refined advertising keywords, and an advertisement serving engine for selecting and providing advertisements associated with the refined advertising keywords for in association with the second search query results.

DESCRIPTION OF DRAWINGS

Like reference symbols in the various drawings indicate like elements.

DETAILED DESCRIPTION

Figure 1:
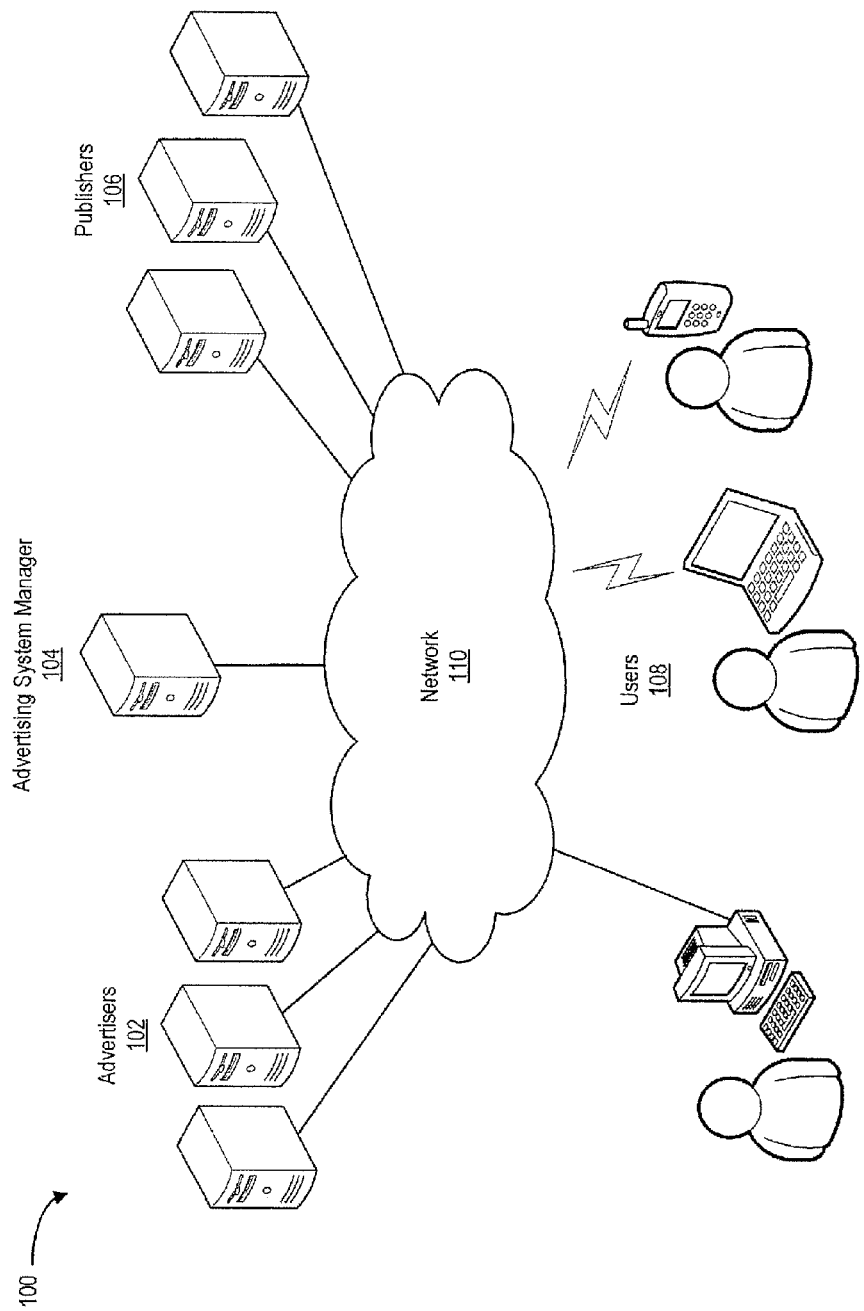
FIG. 1 is a block diagram showing an example of an advertising system for use with the present invention.

FIG. 1 is a block diagram of an example online advertising system 100. In some implementations, one or more advertisers 102 can directly, or indirectly, enter, maintain, and track advertisement information in an advertising management system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as a links, meta-information, and/or machine executable instructions. One or more publishers 106 may submit requests for advertisements to the system 104. The system 104 responds by sending advertisements to the requesting publisher 106 for placement on one or more of the publisher's web properties (e.g., websites and other network-distributed content). Though reference is made to advertisements, other forms of content can be served by the system 104.

Other entities, such as users 108 and the advertisers 102, can provide usage information to the system 104, such as, for example, whether or not a conversion or click-through related to an advertisement has occurred. This usage information can include measured or observed user behavior related to advertisements that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. This combined content and advertisements can be sent to the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc.

The search service can combine the search results with one or more of the advertisements provided by the system 104. This combined information can then be forwarded to the user 108 that requested the content. The search results can be maintained as distinct from the advertisements, so as not to confuse the user between paid advertisements and presumably neutral search results.

Finally, the search service can transmit information about the advertisement and when, where, and/or how the advertisement was to be rendered back to the system 104.

As can be appreciated from the foregoing, the advertising management system 104 can serve publishers 106, such as content servers and search services. The advertising management system 104 permits serving of advertisements targeted to documents served by content servers. For example, a network or inter-network may include an advertisement server serving targeted advertisements in response to requests from a search service with advertisement spots for sale. Suppose that the inter-network is the World Wide Web. The search service can crawl much or all of the content. Some of this content will include advertisement spots (also referred to as "inventory") available. More specifically, one or more content servers may include one or more documents. Documents may include web pages, email, content, embedded information (e.g., embedded media), meta-information and machine executable instructions, and advertisement spots available. The advertisements inserted into advertisement spots in a document can vary each time the document is served or, alternatively, can have a static association with a given document.

When an online ad is served, one or more parameters may be used to describe how, when, and/or where the ad was served. These parameters are referred to as "serving parameters" below. Serving parameters may include, for example, one or more of the following: features of (including information on) a page on which the ad is served (including one or more topics or concepts determined to be associated with the page, information or content located on or within the page, information about the page such as the host of the page, the importance of the page as measured by e.g. traffic, freshness, quantity and quality of links to or from the page etc., the location of the page within a directory structure, etc.), a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad is served in response to, an absolute position of the ad on the page on which it is served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention. Although serving parameters may be extrinsic to ad features, they may be associated with an ad as conditions or constraints. When used as serving conditions or constraints, such serving parameters are referred to simply as "serving constraints".

Serving constraints may also be referred to as "targeting criteria". For example, in some systems, an advertiser may be able to specify that its ad is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a Web page being served includes certain topics or concepts, or falls under a particular cluster or clusters, or some other classification or classifications. One example of content targeting of this type can be found in U.S. patent application Ser. No. 10/649,585, entitled "Content-targeted advertising using collected user behavior data," filed Aug. 27, 2003 and incorporated by reference in its entirety herein.

Figure 2:
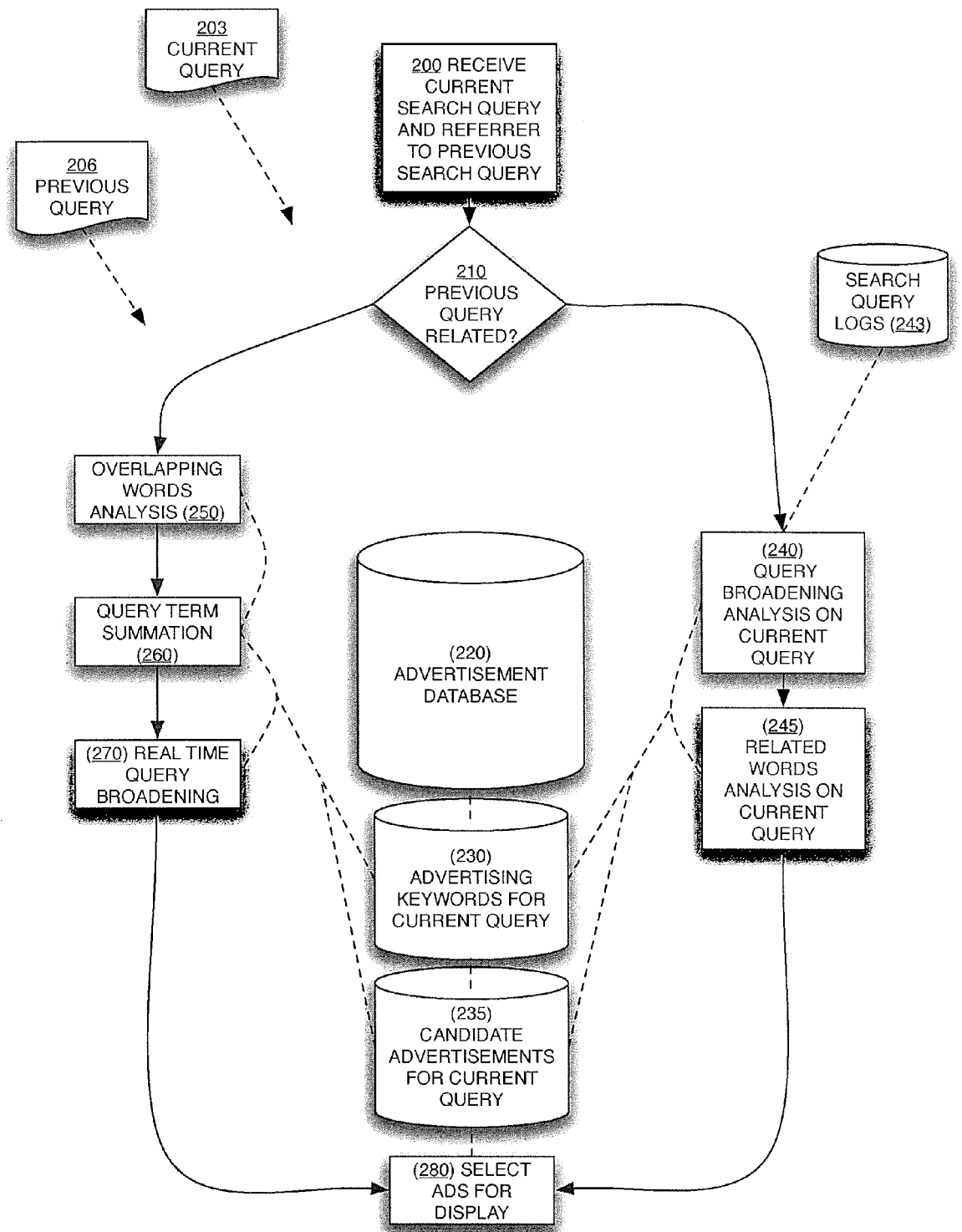
FIG. 2 is a block diagram showing an example of a process for targeting ads based on a current search query and a previous search query.

FIG. 2 is a block diagram showing an example of a process for targeting ads based on a current search query and a previous search query. In a query receiving step 200, the advertising system receives a current query 203 and a referrer including a previous query 206. The system in a determining step 210 then determines whether the current query 203 and the previous query 206 are related, using methods described below. If the queries are deemed unrelated, or there is no previous query 206 in the referrer, then a standard two step process of query broadening 240 and related words analysis 245 is performed. The query broadening process uses search query logs 243, and based on the steps creates a list of advertising keywords 230 which, through an advertising database 220, are associated with a number of candidate advertisements 235 that are related to the advertising keywords 230 found by the query broadening 240 and related words analysis 245. Finally, a final set of ads is selected for display in an ads selection step 280.

Returning to step 210, if a previous query 206 exists and is related to the current query 203, then some combination of an overlapping words analysis 250, a query term summation analysis 260, and a real time query broadening analysis 270, are performed to create a set of potential advertising keywords 230. The potential advertising keywords are associated, according to an advertising database 220, to a set of candidate advertisements 235 for the current query. Then a final set of advertisements is selected in a selection step 280 for display.

In one embodiment, two methods are provided for expanded matching of search queries to potential advertising keywords based on the current query without a previous query. These methods can be used when no related previous query exists, or they can be used in addition to the overlapping words analysis 250, query term summation 260, and real time query broadening 270 methods when a previous query related to the current query does exist. These methods target to words that are not directly part of the current query:

Related Words 245.

Sources of data including but not limited to, for example, information from term clustering tools, synonym dictionaries, and machine learning systems are mined to find words that are related to a given word found in a search query. When generating advertising keywords 230 for a particular search query, one can substitute words in the query with the related words so found. For example, if the words "cars" and "autos" are related words to "car" then for the query "ford car", one can also generate potential advertising keywords for the equivalent queries "ford cars" and "ford autos." One exemplary system for performing this related words expansion for advertising keywords related to an input term such as a search query is found in U.S. patent application Ser. No. 10/647,888, entitled "Increasing a Number of Relevant Advertisements Using a Relaxed Match," filed Sep. 30, 2003 and incorporated by reference herein in its entirety.

Query Broadening 240.

In place of substituting individual terms in a query when generating advertising keywords 230, one can generate related queries as potential advertising keywords 230 for a given query and substitute the given query in its entirety with the related query. For example, the query term "disneyworld florida" may be considered a related query to "theme parks," and if a user searches for the exact query "theme parks," or minor syntactic variations of it, one can substitute that query wholly with the query "disneyworld florida" as an advertising keyword for targeting. One exemplary system for determining related queries for serving ads is disclosed in U.S. Prov. Pat. App. 60/915,094, filed Apr. 30, 2007 and incorporated by reference in its entirety herein.

Both these methods typically use an existing historical log of search queries 243, and other data sources, to generate aggregate patterns that are used to fetch relevant ads. Historical logs of queries are helpful in determining the general relationship between the meaning of individual query terms and entire search queries. However, the context of a current query can possibly relate to many other terms or related queries. Thus, it has been found that by using non-aggregate information from the immediate search session, i.e. the user's previous query, improved disambiguation, broadening and relevant related terms for advertising keywords can be found for a particular user query.

One exemplary method that can be used to target ads based on query words works as follows. For a query (W) entering the advertising targeting system of the form: $(W)=(w_1 \, w_2 \ldots w_n)$, where $w_1, w_2 \ldots, w_n$ are the words from the user query, a keyword generator component of the system generates x subsets of the query (W), dubbed $(w1', w2' \ldots, wn')_x$ or $(W')_x$ in shorthand For each subset of advertising keywords 230 that is generated, candidate advertisements 235 are retrieved that are targeted for that subset of words from a larger advertisement database 220. In addition for each word $w_1, w_2 \ldots, w_n$, related words $s_1, s_2 \ldots, s_n$ can be substituted for one or more of the words $w_1, w_2 \ldots, w_n$ as discussed above. The exact order of words in the query, and substitution of individual words in the query, may or may not be considered when retrieving ads. These ads are candidate advertisements that are generated for this query based on the query subsets, and typically will not all be served.

Selection of individual ads to be served 280 from the candidate advertisements 235 is then performed. Whether any of the candidate advertisements gets shown, in one embodiment, depends on the quality score of the advertisement and its bid as compared to the other candidate ads. One example of an auction model for a set of candidate ads is found in U.S. patent application Ser. No. 10/112,654, entitled "Methods and Apparatus for Ordering Advertisements Based on Performance Information and Price Information," filed Mar. 29, 2002 and incorporated by reference in its entirety herein.

Consider the following example query: cheap used cars. If we consider autos and car as related to cars, then for the above query we will generate the following subsets:

TABLE 1

| Expanded Match + Related Words | Expanded Match + Related Words | Related Words |
| --- | --- | --- |
| cheap | cheap used | cheap used cars |
| used | cheap cars | cheap used car |
| cars | cheap car | cheap used autos |
| car | cheap autos | |
| autos | used cars | |
| | used car | |
| | used autos | |

An ad that is targeted to any of the above subsets can potentially be shown for this query.

Determining Whether to Use the Previous Query for Targeting 210.

Not all queries are sufficiently related to previous queries for the previous queries to be useful for ad targeting. In particular, various types of information can be used to decide whether the previous query 206 should be used in targeting for the current query 203. For example, one may consider timing information and use the previous query only if it was executed within a certain time window before the present query. One might also apply techniques to determine the similarity of the previous query with the current one and use the previous query if it meets a desired similarity level. One exemplary system for determining whether two sets of words are related to one another, e.g. in a cluster, can be found in U.S. patent application Ser. No. 10/676,571, entitled "Method and Apparatus for Characterizing Documents Based on Clusters of Related Words," filed Sep. 30, 2003, incorporated by reference in its entirety herein, and U.S. Pat. No. 7,231,393, entitled "Method and Apparatus for Learning a Probablistic Generative Model for Text," issued Jun. 12, 2007, also incorporated by reference in its entirety herein. See also Sahami, M. and Heilman, T. D. 2006. *A web-based kernel function for measuring the similarity of short text snippets*. In Proceedings of the 15th International Conference on World Wide Web (Edinburgh, Scotland, May 23-26, 2006). WWW '06. ACM Press, New York, N.Y., 377-386.

In addition, a previous query may be considered useful in some embodiments when, for example and without limitation, (1) queries that have an associated non-empty query in the referrer string, (2) the current query is not a spell-correct query from the previous query, (3) the current query is not the same as the previous query, such as when the current page is an additional page of search results from the previous page. (In this last instance, in one embodiment, any preexisting previous query information from the previous page can be preserved and continue to be used for ad serving). Moreover, the referrer string as a source for previous query information does not introduce any additional latency and is in many cases likely to be related to the user's information need for current query.

Methods for Using the Previous Query for Targeting.

If the previous query is deemed relevant to the current query, then one can use information from both the current query and the previous query to target ads. In addition to steps 240 and 245 (current query broadening and related word analysis), the following additional steps can be used. Herein are described three exemplary techniques for targeting ads and/or disambiguating ad keywords for targeting ads based on the previous query that can be applied separately or together.

Technique 1: Overlapping Words 250.

For words that are common to previous query and current query, it is desirable to keep those common overlapping words in at least some of the query broadening and related words sets. For example, for the two queries "hotels in New York" and "Manhattan hotels sale" the term "hotels" is an overlapping term common to both queries. In some embodiments one can limit the dropping of "too many" such overlapping words when generating the subsets of advertising keywords against which candidate advertisements are matched. Consideration of what constitutes dropping "too many" overlapping words when generating advertisement keywords can be determined in a number of ways, including but not limited to, for example: (1) no overlapping words are dropped, (2) only a certain fraction or ratio of overlapping words (relative to the number of overlapping words, or relative to the total number of words in the query, for example) can be dropped, (3) only a certain fraction or ratio of overlapping words that are not stopwords can be dropped, (4) only less than a fixed threshold number of overlapping words can be dropped, or (5) only less than a fixed threshold number of overlapping words excluding stopwords can be dropped.

Limiting the dropping of overlapping words is an advantageous technique because words that are common to both queries are more likely to be relevant to the intent of the search queries, and hence important to the user. The user may have deleted, modified, or added other words to a set of queries but retained these overlapping words because they are important to what the user is looking for. While this technique may result in fewer advertising keywords 230 and fetch fewer candidate advertisements 235 it is expected to improve the relevancy of the ads served to the user. Additionally, this technique can be used when a search query generates a large number of advertising keywords 230 and/or candidate advertisements 235, wherein this technique can effectively prune the set of advertising keywords 230 until the resulting set of candidate advertisements 235 is below a certain threshold.

Technique 2: Adding Words from the Previous Query (Query Term Summation) 260.

If the previous query contains words that are not part of the current query, but the two queries are related, then in some embodiments the terms from the previous query can be added to the terms from the current query for generating the set of words that are used to generate subsets of advertising keywords 230 for candidate advertisements 235. This can be considered a form of query term summation. Let (S) be the bag of words from the current query 203. Let (P) be the previous query 206 and let (P)' be the set of words from previous query that are not part of (S). One can then consider ((S)+(P)') when generating the targeting subsets of advertising keywords as described earlier. In some embodiments, for example, one can employ a set of rules for determining when such an aggregation of terms from the current and previous query is to be used.

For example, let $(W)=(w1, w2, \ldots, wn)=(S+P')$ be the set of words from the current query (S) and any new words from previous query (P'). We will generate subsets x of (W), dubbed $(w1', w2', \ldots, wn')_x$ or $(W)_x$ for short. If $(W)_x$ contains words from previous query $((W)_x \cap P')$ is non-empty) then we will use $(W)_x$ only if it has sufficient overlap with words from the current query (S). In other words, $|((W)_x \cap S)|$ should be non-zero and/or above a particular threshold, i.e. $|((W)_x \cap S)|>k$. Sufficient overlap can be interpreted as, for example and without limitation, (1) there are at least k (threshold)

words common to both $(W)_x$ and S, (2) there are at least k (threshold) non-stopwords common to both $(W)_x$ and S, or (3) the same as above in (1) or (2) except k is a fraction of the size of S, the size of P, or of the combination of S and P. In some embodiments, the ratio or fraction k can be ¼, ⅓ or ½.

This technique recognizes that new words from a previous query known to be related to the present query may help in fetching more ads that are relevant to what the user is looking for and/or disambiguate some of the words from the current query to improve relevancy.

For example, if the current query is "hotels in seattle", and the previous query is "Hilton," one embodiment might generate the following subsets of advertising keywords based only on the current query (Table 2) and a different set of advertising keywords using the previous query in addition (Table 3):

TABLE 2

Advertising keywords
based on current query
"Hotels in Seattle" only hotels in Seattle
hotels Seattle
in Seattle
in hotels
hotels
in
Seattle

TABLE 3

Advertising keywords based on
current query "Hotels in
Seattle" and previous query
"Hilton"

Hilton Hotels
Hilton Seattle
Hilton Hotels in Seattle
Hilton in Seattle
Hilton in hotels
Hilton Seattle hotels The list of advertising keywords in Table 3 did not include the subsets "hilton" and "hilton in" because, in this example, the term "in" can be considered a "stopword." The advertising keywords of Table 3 employed sufficient overlap with current query where the overlap had to be in form of a non-stopword, as in the example conditions described above. As before, one may also expand words for the previous query using related words for the previous query when generating subsets.

In some embodiments, words from previous query that do not appear in current query and their number are considered. Additional words from previous query are added to the combinations or subset of words that are enumerated for finding advertising keywords. In some embodiments, these additional words are not subjected to related words analysis, but they may be in some implementations. When an original word from the previous query is added to the combination of terms used for finding advertising keywords, the combination is considered itself as a potential advertising keyword as if it was the result of a related words analysis. In some embodiments, any combination or subset of words to be considered as an advertising keyword is checked to see if it is a valid combination of terms derived using previous query words.

Technique 3: Query Broadening 270.

The general current query broadening analysis 240 described earlier can operate by, for example, looking up a list of related queries (computed offline using log analysis as discussed previously) for the current query and uses the related query to fetch more ads. As mentioned earlier, when using query broadening for ads targeting it is not required to consider subparts or individual words of the query, just the related query in whole. For targeting using the previous query, however, one can treat the previous query 206 as a related query with respect to the current query 203, and thereby use the previous query as a query broadening candidate.

Additionally, one may add additional candidate queries related to previous query, either from additional previous search queries made in real time by the user, or from traditional query broadening methods using non-real time offline query logs. Alternatively, one can also analyze search query logs to build aggregate query models associating a first query Q1, with other earlier (or preceeding) queries Q1', Q2', Q3', etc that may be relevant.

Similarly, click through rate effectiveness can be determined in an improved manner by logging previous queries (or parts of it) relative to advertisement impression logs and using this second order previous query data as a signal of advertisement quality.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
  receiving at a search server a current search query from a user;
  receiving a referrer associated with the received current search query, the referrer including information identifying a previous search query from the user;
  determining, using the search server, whether a topic of the previous search query is related to a topic of the current search query, wherein the previous search query is not the same as the current search query, and upon determining that a topic of the previous search query is determined to be related to a topic of the current search query:
  (a) determining a level of relevance of the previous search query to the current search query; and
  (b) identifying at least one advertising keyword based on different terms of at least the current search query and the previous search query and selecting at least one advertisement using the at least one advertising keyword;
  identifying results to be provided in response to the current search query; and
  delivering the at least one advertisement to the user with the results of the current search query.

2. The method of claim 1, further comprising:
  analyzing the current query and the previous query using at least one of an overlapping words analysis, a query term summation analysis and a real time query broadening analysis to derive the at least one advertising keyword.

3. The method of claim 1, wherein the determining step further comprises disambiguating advertising keywords associated with the current search query based on advertising keywords relevant to the current search query that are associated with the previous search query.

4. The method of claim 1, further comprising:
retaining the results of identifying at least one advertising keyword based on different terms of at least the current search query and the previous search query;
receiving a next search query from the user;
receiving a referrer associated with the next search query, the referrer including information identifying the current search query;
determining whether a topic of the current search query is related to a topic of the next search query, and if so, determining a level of relevance of the current search query to the next search query;
determining, using the search server, whether a topic of the previous search query is related to a topic of the next search query, and if so, determining a level of relevance of the previous search query to the next search query;
upon determining that a topic of the current search query is related to a topic of the next search query and determining that a topic of the previous search query is related to a topic of the next search query, identifying at least one advertising keyword based on different terms of at least the next search query, the current search query and the previous search query and selecting at least one advertisement using the at least one advertising keyword;
identifying results to be provided in response to the current search query; and
delivering the at least one advertisement to the user with the results of the next search query.

5. A system for providing targeted advertisements to a user, comprising:
a search server on a network for receiving search queries via a standard communications protocol and serving search query results in response to the search queries, the search query results associated with at least one advertisement;
a first search query associated with a user transmitted in the standard communications protocol to the search server;
a second search query associated with the user transmitted to the search server in the standard communications protocol, including information identifying the first search query, wherein the first search query is not the same as the second search query; and,
an advertising computer server system that includes:
a keyword engine for determining potential second search query advertising keywords associated with the second search query received from the search server,
a disambiguation engine for refining the potential advertising keywords associated with the second search query by determining whether a topic of the first search query is related to a topic of the second search query and determining potential advertising keywords based on different terms of the first search query and the second search query to find a set of refined advertising keywords, and
an advertisement serving engine for selecting and providing advertisements associated with the refined advertising keywords in association with the second search query results.

6. The system of claim 5, further comprising:
a third search query associated with a user transmitted in the standard communications protocol to the search server, for which the keyword engine determines a set of potential third search query advertising keywords; and,
the disambiguation engine further comprising:
a memory for retaining advertising keywords previously found in the disambiguation engine for the first search query and second search query, said disambiguation engine refining the potential third search query advertising keywords using keywords associated with the third search query, advertising keywords associated with the second search query that are relevant to the third search query, and advertising keywords retained in memory that are associated with at least one of the first search query and the second search query and that are relevant to the third search query.

7. The system of claim 5, further comprising a keyword filtering engine in the disambiguation engine for finding advertising keywords from the current query and the previous query, the keyword filtering engine including at least one of an overlapping words analysis engine, a query term summation engine, and a real time query broadening engine.

8. A method comprising:
receiving, at a computer device, a current search query from a user;
receiving information identifying a previous search query from the user;
determining whether a topic of the previous search query is related to a topic of the current search query, and if so, determining a level of relevance of the previous search query to the current search query, wherein the previous search query is not the same as the current search query;
upon determining that the topic of the previous search query is related to the topic of the current search query, identifying at least one advertising keyword based on different terms of at least the current search query and the previous search query and selecting at least one advertisement using the at least one advertising keyword;
identifying results to be provided in response to the current search query; and
delivering, using the computer device, the at least one advertisement to the user with the results of the current search query.

9. The method of claim 8, further comprising:
analyzing the current query and previous query using at least one of an overlapping words analysis, a query term summation analysis and a real time query broadening analysis to derive the at least one advertising keyword.

10. The method of claim 1, further comprising:
extracting, using the referrer, the previous search query from a request that includes the current search query.

11. The system of claim 5, further comprising:
a referrer associated with the second search query, the referrer including a URL associated with the previous search query.

12. The method of claim 8, further comprising:
extracting, using the referrer, the previous search query from a request that includes the current search query.

* * * * *